(12) United States Patent
Jung et al.

(10) Patent No.: US 8,189,699 B2
(45) Date of Patent: May 29, 2012

(54) METHOD FOR TRANSMITTING ACK/NACK SIGNAL AND METHOD FOR ESTABLISHING THE SIGNAL TRANSMISSION

(75) Inventors: In Jae Jung, Gyeongsangbuk-do (KR); Bong Hoe Kim, Gyeongsangbuk-do (KR); Ki Jun Kim, Gyeongsangbuk-do (KR); Dong Youn Seo, Gyeongsangbuk-do (KR); Hak Seong Kim, Gyeongsangbuk-do (KR); Dae Won Lee, Gyeongsangbuk-do (KR); Suk Hyon Yoon, Gyeongsangbuk-do (KR); Joon Kui Ahn, Gyeongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 623 days.

(21) Appl. No.: 12/443,179

(22) PCT Filed: Sep. 28, 2007

(86) PCT No.: PCT/KR2007/004759
§ 371 (c)(1),
(2), (4) Date: Mar. 26, 2009

(87) PCT Pub. No.: WO2008/039025
PCT Pub. Date: Apr. 3, 2008

(65) Prior Publication Data
US 2010/0008435 A1    Jan. 14, 2010

Related U.S. Application Data

(60) Provisional application No. 60/827,386, filed on Sep. 28, 2006.

(30) Foreign Application Priority Data

Nov. 20, 2006 (KR) .................. 10-2006-0114558

(51) Int. Cl.
*H04L 27/28* (2006.01)
(52) U.S. Cl. ...................... 375/260; 375/295
(58) Field of Classification Search .......... 375/260, 375/267, 295, 299
See application file for complete search history.

(56) References Cited

U.S. PATENT DOCUMENTS

2008/0046793 A1* 2/2008 Heo et al. .............. 714/748
2010/0182975 A1* 7/2010 Malladi et al. ............ 370/330

FOREIGN PATENT DOCUMENTS

| KR | 10-2005-0098131 A | 10/2005 |
| WO | 2004062205 A1 | 7/2004 |
| WO | 2005119959 A1 | 12/2005 |

\* cited by examiner

*Primary Examiner* — David Lugo
(74) *Attorney, Agent, or Firm* — Lee, Hong, Degerman, Kang & Waimey

(57) ABSTRACT

A method for transmitting an ACK/NACK signal and a method for establishing the signal transmission are disclosed. A system for the method determines whether the ACK/NACK signal is repeatedly transmitted or not according to channel environments of a user, and transmits the ACK/NACK signal according to the determined result within a single TTI. Areas unused for transmitting the ACK/NACK signal are allocated for data, resulting in an increased reception reliability of the ACK/NACK signal.

7 Claims, 8 Drawing Sheets

METHOD FOR TRANSMITTING ACK/NACK SIGNAL AND METHOD FOR ESTABLISHING THE SIGNAL TRANSMISSION

CROSS-REFERENCE TO RELATED APPLICATIONS

This application is the National Stage filing under 35 U.S.C.§371 of International Application No. PCT/KR2007/004759, filed on Sep. 28, 2007, which claims the benefit of earlier filing date and right of priority to Korean Application No. 10-2006-0114558, filed on Nov. 20, 2006, and also claims the benefit of U.S. Provisional Application Ser. No. 60/827,386, filed on Sep. 28, 2006.

TECHNICAL FIELD

The present invention relates to a wireless communication technology, and more particularly to a method for transmitting an ACK/NACK signal and a method for establishing the signal transmission.

BACKGROUND ART

The present invention may be used for an orthogonal frequency division multiplexing (OFDM) communication scheme, a DFT-S-OFDM communication scheme, and an orthogonal frequency division multiple access (OFDMA) communication scheme, and may also be used for a communication scheme which transmits data by a plurality of sub-carriers and maintains orthogonality between the sub-carriers.

Representative communication methods for the multi-carrier system are the OFDMA scheme, the DFT-S-OFDM (DFT Spreading OFDM) scheme, and the OFDMA scheme, and detailed description thereof will hereinafter be described in detail.

OFDM Scheme

The OFDM scheme will hereinafter be described in detail.

According to the basic principles of the OFDM scheme, the OFDM scheme divides a high-rate data stream into many slow-rate data streams, and simultaneously transmits the slow-rate data streams via many carriers. Each of the carriers is called a sub-carrier.

The orthogonality exists between many carriers of the OFDM scheme. Accordingly, although frequency components of the carrier are overlapped with each other, the overlapped frequency components can be detected by a reception end. A high-rate data stream is converted to a low-rate data stream by a serial to parallel (SP) converter. The individual sub-carriers are multiplied by the parallel data streams, the individual data streams are added to the multiplied result, and the added result is transmitted to the reception end.

The several parallel data streams generated by the S/P converter may be transmitted as several sub-carriers to the reception end by an Inverse Discrete Fourier Transform (IDFT). The IDFT scheme can be effectively implemented by an Inverse Fast Fourier Transform (IFFT).

Relative signal dispersion in a time domain occurs by multi-path delay dispersion. Since a symbol duration of the low-rate sub-carrier increases, the temporal signal dispersion decreases. A long guard interval longer than the length of a channel delay spreading is inserted between the OFDM symbols, so that an inter-symbol interference can be reduced. If some parts of the OFDM signals are copied and arranged in the above-mentioned guard interval, the OFDM symbol is cyclically extended to protect the symbol from others.

DFT-S-OFDM Scheme

The DFT-S-OFDM scheme will hereinafter be described in detail. The DFT-S-OFDM scheme is called a single carrier—FDMA (SC-FDMA). The SC-FDMA scheme mainly applied to an uplink performs the spreading based on the DFT matrix in a frequency area before generating the OFDM signal, modulates the spreading result according to the conventional OFDM scheme, and transmits the modulated result.

FIG. 1 is a conceptual diagram illustrating a transmission end based on the DFT-S-OFDM scheme.

Some variables are defined to explain operations of the above-mentioned conventional apparatus of FIG. 1. "N" is indicative of the number of sub-carriers transmitting the OFDM signal. "Nb" is indicative of the number of sub-carriers for a predetermined user. "F" is indicative of a Discrete Fourier Transform (DFT) matrix, "s" is indicative of a data symbol vector, "x" is indicative of a data dispersion vector in the frequency area, and "y" is indicative of an OFDM symbol vector transmitted in the time area.

The SC-FDMA scheme converts each data symbol (s) into a parallel signal by the S/P converter 110. Before the DFT spreading module 120 transmits the data symbol (s), the data symbol (s) is dispersed, as represented by the following equation 1:

$$x = F_{N_b \times N_b} s \qquad [\text{Equation 1}]$$

In Equation 1, $F_{N_b \times N_b}$ is indicative of a NB-sized DFT matrix to disperse the data symbol (s).

The sub-carrier mapping unit 130 performs the sub-carrier mapping on the dispersed vector (x) according to a predetermined sub-carrier allocation technique. The mapping resultant signal is converted into a time-domain signal by the IDFT module 140, the time-domain signal is applied to the parallel/serial converter 150, and a desired signal to be transmitted to the reception end is acquired. In this case, the transmission signal applied to the reception end can be represented by the following equation 2:

$$y = F_{N \times N}^{-1} x \qquad [\text{Equation 2}]$$

In Equation 2, $F_{N \times N}^{-1}$ is indicative of the N-sized IDFT matrix for converting a frequency-domain signal into a time-domain signal. A cyclic prefix insertion unit 160 inserts a cyclic prefix into the signal (y) created by the above-mentioned method, so that the resultant signal is transmitted. This method capable of generating the transmission signal and transmitting the same to the reception end is called an SC-FDMA method. The size of the DFT matrix can be controlled in various ways to implement a specific purpose.

OFDMA Scheme

The OFDMA scheme will hereinafter be described in detail. The OFDMA scheme is indicative of a multi-access method for providing some parts of the sub-carriers available for a modulation system based on orthogonal sub-carriers to individual users, so that a multi-access between the users is implemented.

The OFDMA provides frequency resources called sub-carriers to the individual users. As well known in the art, the frequency resources are applied to the users independent of each other, so that they are not overlapped with each other.

Data of a user equipment (UE) in the above-mentioned SC-FDMA or OFDMA system can be transmitted to a destination according to the following two methods, i.e., a localized allocation method, and a distributed allocation method.

The localized allocation method is designed to transmit the UE data using resources composed of sub-carriers neighboring with each other.

The distributed allocation method is designed to transmit the UE data using resources composed of sub-carriers spaced apart from each other at intervals of a predetermined distance.

In the meantime, data, pilots, and control information can be transmitted to an uplink. The data transmitted to the uplink is equal to the UE data, and a band allocation or a transport format may be determined by a downlink control signal.

The pilot signal can be classified into a channel quality (CQ) pilot and a demodulation (DM) pilot. The CQ pilot is used to measure a channel quality (CQ). The DM pilot performs channel estimation and data demodulation during the data transmission.

When the user performs the scheduling result from a frequency area at a specific time and transmits the resultant data, the above-mentioned pilot for performing the channel estimation and the data demodulation during the data transmission is transmitted from the corresponding area.

The control information can be classified into two control information, i.e., data-associated control information and non-data-associated control information.

The data-associated control information is required to recover data transmitted from the UE. For example, the data-associated control information may correspond to information associated with a transport format or HARQ-associated information. The amount of data-associated control information is adjusted by the scheduling method of uplink data.

The non-data-associated control information is required to implement downlink transmission of data. For example, the non-data-associated control information may correspond to a channel quality indicator (CQI) capable of generating the ACK/NACK signal for the HARQ operation and performing link adaptation of a downlink.

In the meantime, the format of uplink data (i.e., data transmitted to an uplink), a pilot and control information will hereinafter be described on the basis of the above-mentioned explanation.

FIG. 2 shows an uplink sub-frame structure.

Referring to FIG. 2, the long blocks (LBs) LB#1~LB#6 contained in the sub-frame structure are used to transmit data and control information. The short block (SBs) SB#1~SB#6 contained in the sub-frame structure of FIG. 3 are used to transmit the pilot and data.

In the meantime, the CP of FIG. 2 indicates a specific area in which a cyclic prefix is inserted. The format of sub-frames shown in FIG. 2 has been disclosed for only illustrative purposes, and other sub-frame structures may also be applied to the present invention.

As described above, the signals transmitted via the uplink by the user can be combined with each other according to the following three cases:

1) UE data, pilot, and data-associated information
2) UE data, pilot, data-associated control information, and non-data-associated control information
3) Pilot, and non-data-associated control information The uplink transmission signals for the above-mentioned cases can be multiplexed in various ways.

FIGS. 3 and 4 show the structures in which data and control information are multiplexed and transmitted in an uplink direction.

In more detail, the method of FIG. 3 multiplexes the data-associated control information and the non-data-associated control information along with the UE data, and at the same time multiplexes non-data-associated control information of several UEs.

The method of FIG. 4 multiplexes the data-associated control information and the UE data, but decides a predetermined time-frequency area to transmit non-data-associated control information of several UEs. In more detail, a third resource block of the second sub-frame of FIG. 2 denotes a band allocated to transmit the non-data-associated control information.

In the meantime, if UE data exists in the case of FIG. 4, the non-data-associated control information of the UE is not transmitted to a band prescribed for the non-data-associated control information, and is transmitted to a transmission band of the UE data, so that the SC-FDMA characteristics can be maintained.

The data-associated control information transmitted to the uplink includes the ACK/NACK signal associated with downlink data and CQI information required for the downlink scheduling. Two multiplexing methods are used to transmit the non-data-associated control information, i.e., a TDM scheme and a FDM scheme. The TDM scheme guarantees a characteristic time area to transmit the ACK/NACK and CQI signals. The FDM scheme arranges the ACK/NACK and CQI signals to a specific frequency area.

However, a detailed method for transmitting the above-mentioned ACK/NACK signal has not yet been developed, so that specific information indicating whether repetitive transmission is required according to channel environments affected by UE's location within a cell, and a method for allocating the ACK/NACK signal and the data transmission area within a single transmission time interval (TTI) used for the 3GPP LTE must be newly developed and proposed by associated developers or companies.

DISCLOSURE

Technical Problem

Accordingly, the present invention is directed to a method for transmitting an ACK/NACK signal and a method for establishing the signal transmission, that substantially obviate one or more problems due to limitations and disadvantages of the related art.

An object of the present invention is to provide a method for transmitting the ACK/NACK signal within the single TTI by deciding whether a user repeatedly transmits the ACK/NACK signal, a ACK/NACK transmission method for clearly defining how to multiplex data and a method for establishing the ACK/NACK transmission method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for determining whether an ACK/NACK signal is repeatedly transmitted within a single transmission time interval (TTI) according to channel environments of a user, and transmitting a signal according to the determined result, the method comprising: if the determined result indicates that the ACK/NACK signal is not repeatedly transmitted, transmitting the ACK/NACK signal to any one of sub-frames contained in the single TTI; and if the determine result indicates that the ACK/NACK signal is repeatedly transmitted, repeatedly transmitting the ACK/NACK signal to the individual sub-frames contained in the single TTI.

Preferably, the ACK/NACK signal in the repeatedly-transmitting step is transmitted to allow time-frequency areas of the individual sub-frames contained in the single TTI to have different locations.

Preferably, the determined result is different according to a distance from a base station (BS) to the user.

Preferably, the transmitting step of the ACK/NACK signal to any one of sub-frames contained in the single TTI further includes: transmitting data to other sub-frames from among the sub-frames contained in the single TTI.

Preferably, the data transmitting step includes: acquiring information indicating whether time-frequency areas for transmitting data of other users are used or not via downlink control information.

In another aspect of the present invention, there is provided a method for establishing signal transmission, which determines whether an ACK/NACK signal is repeatedly transmitted within a single transmission time interval (TTI) according to channel environments of each user, and transmits a signal according to the determined result, the method comprising: if the determined result indicates that the user does not repeatedly transmit the ACK/NACK signal, performing a first setup process in which the ACK/NACK signal is transmitted to any one of sub-frames contained in the single TTI; and if the determined result indicates that the user repeatedly transmits the ACK/NACK signal, performing a second setup process in which the ACK/NACK signal is repeatedly transmitted to the individual sub-frames contained in the single TTI.

Preferably, the method further comprises: if the user who repeatedly transmits the ACK/NACK signal is determined, performing a third setup process for transmitting the ACK/NACK signal by which time-frequency areas of the individual sub-frames contained in the single TTI have different locations.

Preferably, the determined result is different according to a distance from a base station to the user.

Preferably, the method further comprises: performing a fourth setup process for transmitting data to other sub-frames from among the sub-frames contained in the single TTI which is not used to transmit the ACK/NACK signal by the user who does not repeatedly transmit the ACK/NACK signal.

Preferably, the method further comprises: broadcasting allocation information of time-frequency areas for transmitting data of each user via downlink control information.

Preferably, the fourth setup process allows the data and the ACK/NACK signal of the user, who repeatedly transmits the ACK/NACK signal, to be shared in a single symbol in other sub-frames from among the sub-frames contained in the single TTI.

It is to be understood that both the foregoing general description and the following detailed description of the present invention are exemplary and explanatory and are intended to provide further explanation of the invention as claimed.

Advantageous Effects

According to the above-mentioned method for allocating communication resources, the present invention can clearly define a method for determining whether the user's ACK/NACK signal is repeatedly transmitted and transmitting the ACK/NACK signal within a single TTI according to the determined result.

The present invention determines whether the ACK/NACK signal is repeatedly transmitted, and allows corresponding resources to be used for data transmission, so that it maintains a reception reliability of the ACK/NACK signal and increases a processing rate of the same.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings. Wherever possible, the same reference numbers will be used throughout the drawings to refer to the same or like parts.

For the convenience of description and better understanding of the present invention, the following detailed description will disclose a variety of embodiments and modifications of the present invention. In some cases, in order to prevent ambiguous concepts of the present invention from being occurred, conventional devices or apparatus well known to those skilled in the art will be omitted and be denoted in the form of a block diagram on the basis of the important functions of the present invention.

The present invention provides a method for transmitting the ACK/NACK signal corresponding to non-data-associated control information from among the above-mentioned uplink information and a method for establishing the ACK/NACK signal transmission.

The ACK/NACK signal is generated from a reception end (e.g., a receiving user) of data, so that it indicates whether data transmitted from a transmission end (e.g., a transmitting user) is correctly received in the reception end, and is required for constructing a communication system. In other words, if the reception end receives correct data, it transmits the ACK signal. Otherwise, if the reception end receives incorrect or erroneous data, it transmits the NACK signal.

Upon receiving the NACK signal, the data transmission end allows the reception end to receive correct information using a re-transmission method.

A basic unit of uplink transmission to transmit the above-mentioned ACK/NACK signals is a TTI, and a detailed description of the TTI will hereinafter be described.

Figure 1:
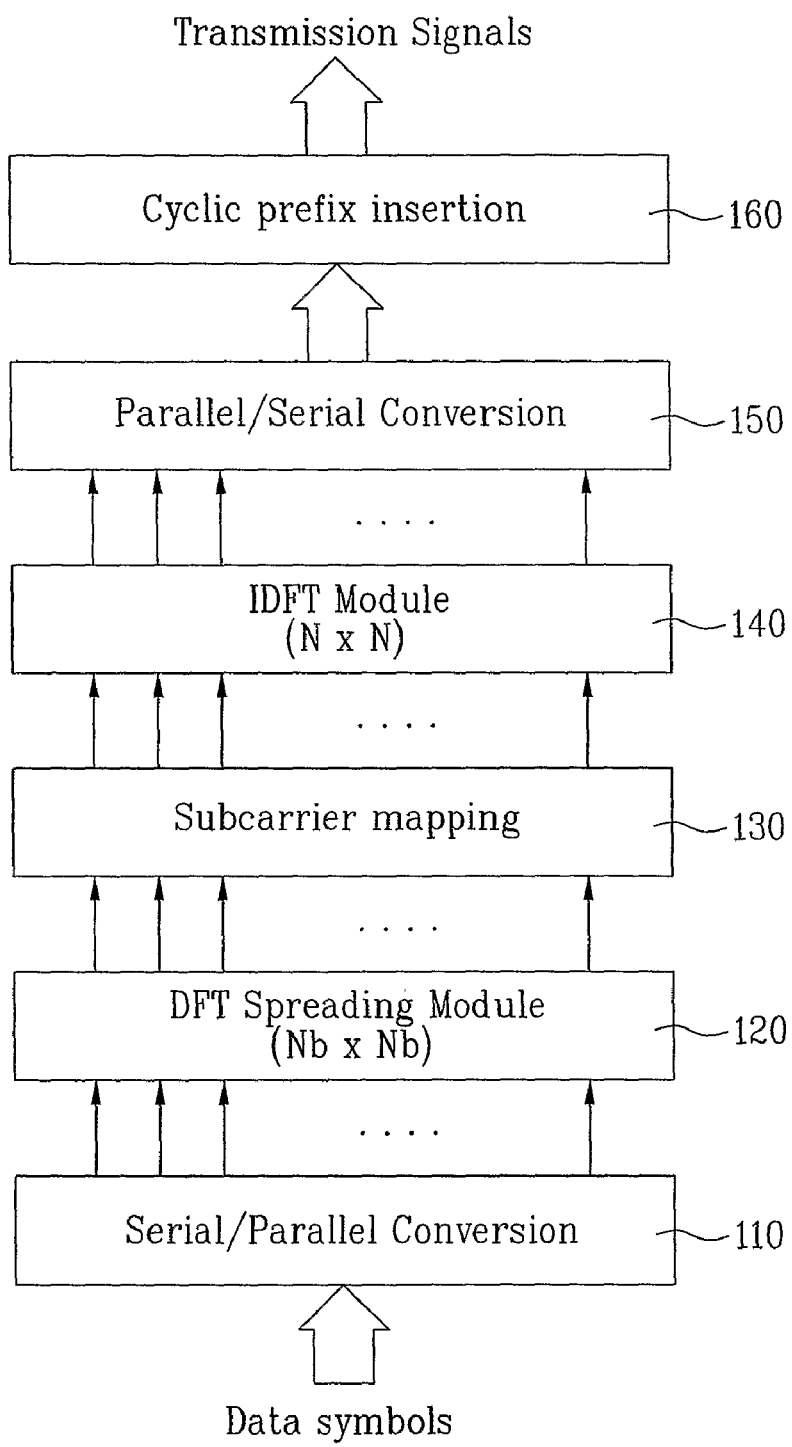
FIG. 1 is a conceptual diagram illustrating a transmission end based on the DFT-S-OFDM scheme.
Figure 2:
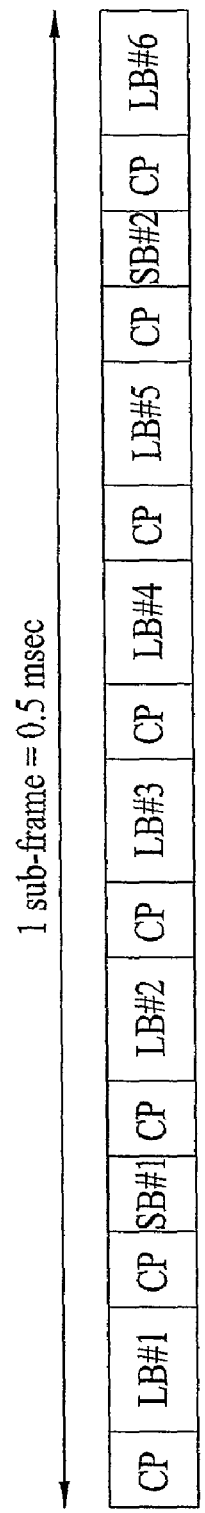
FIG. 2 shows a uplink sub-frame structure.
Figure 3:
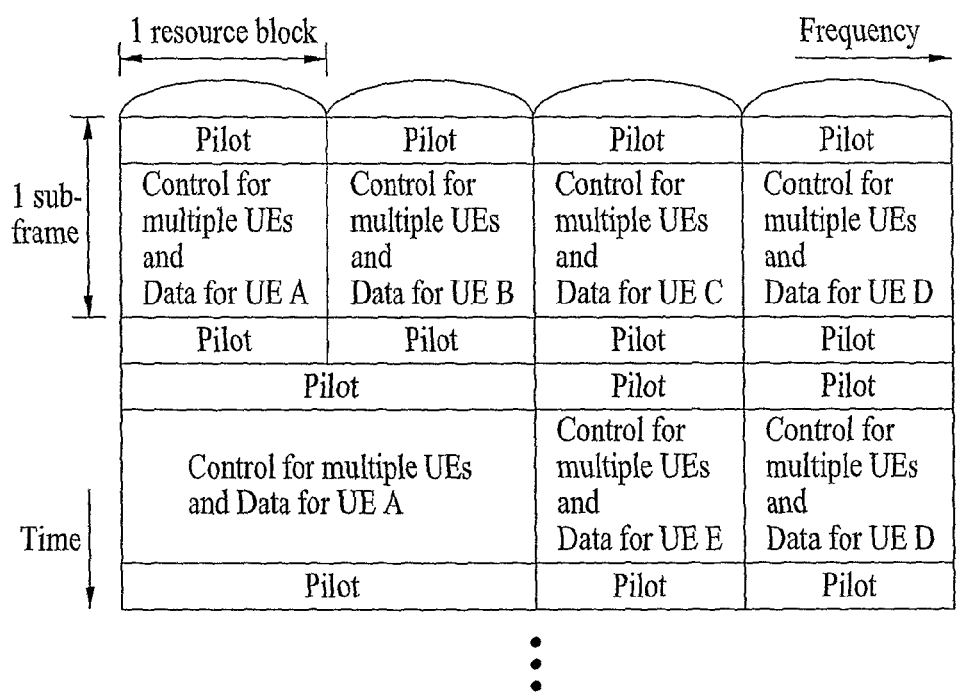
FIGS. 3~4 show the structures in which data and control information are multiplexed and transmitted in an uplink direction.
Figure 4:
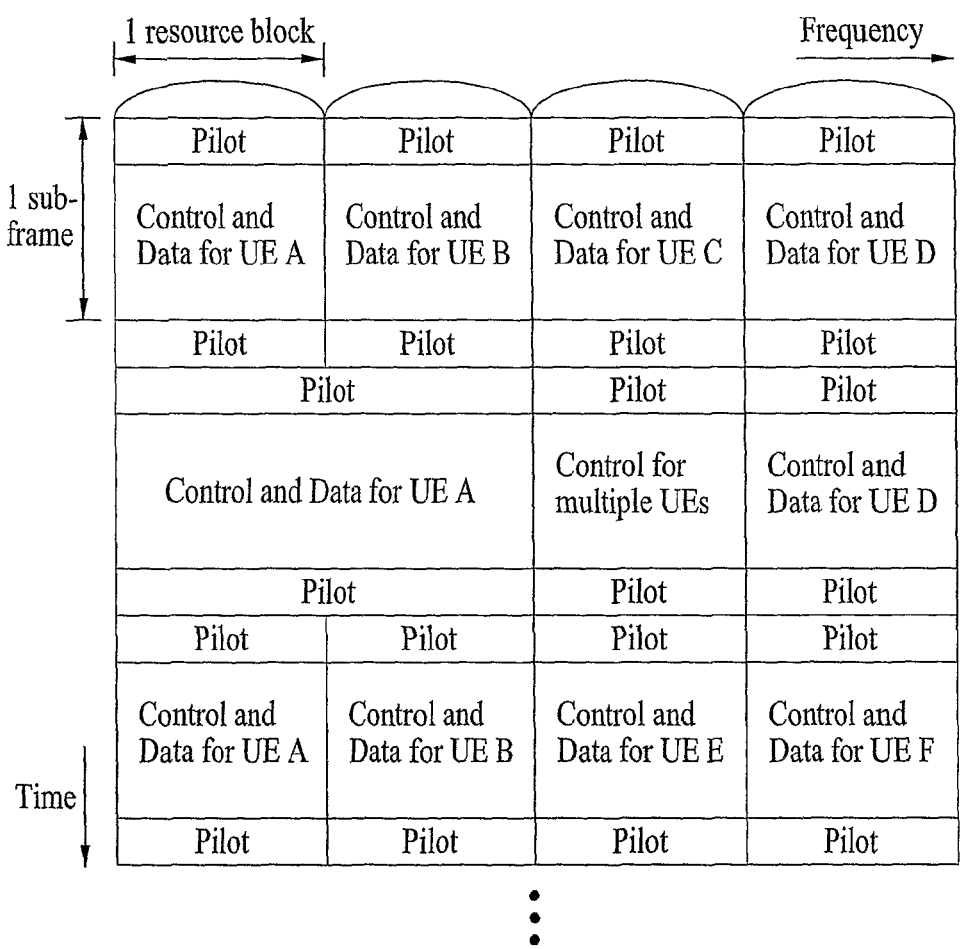
Figure 5:
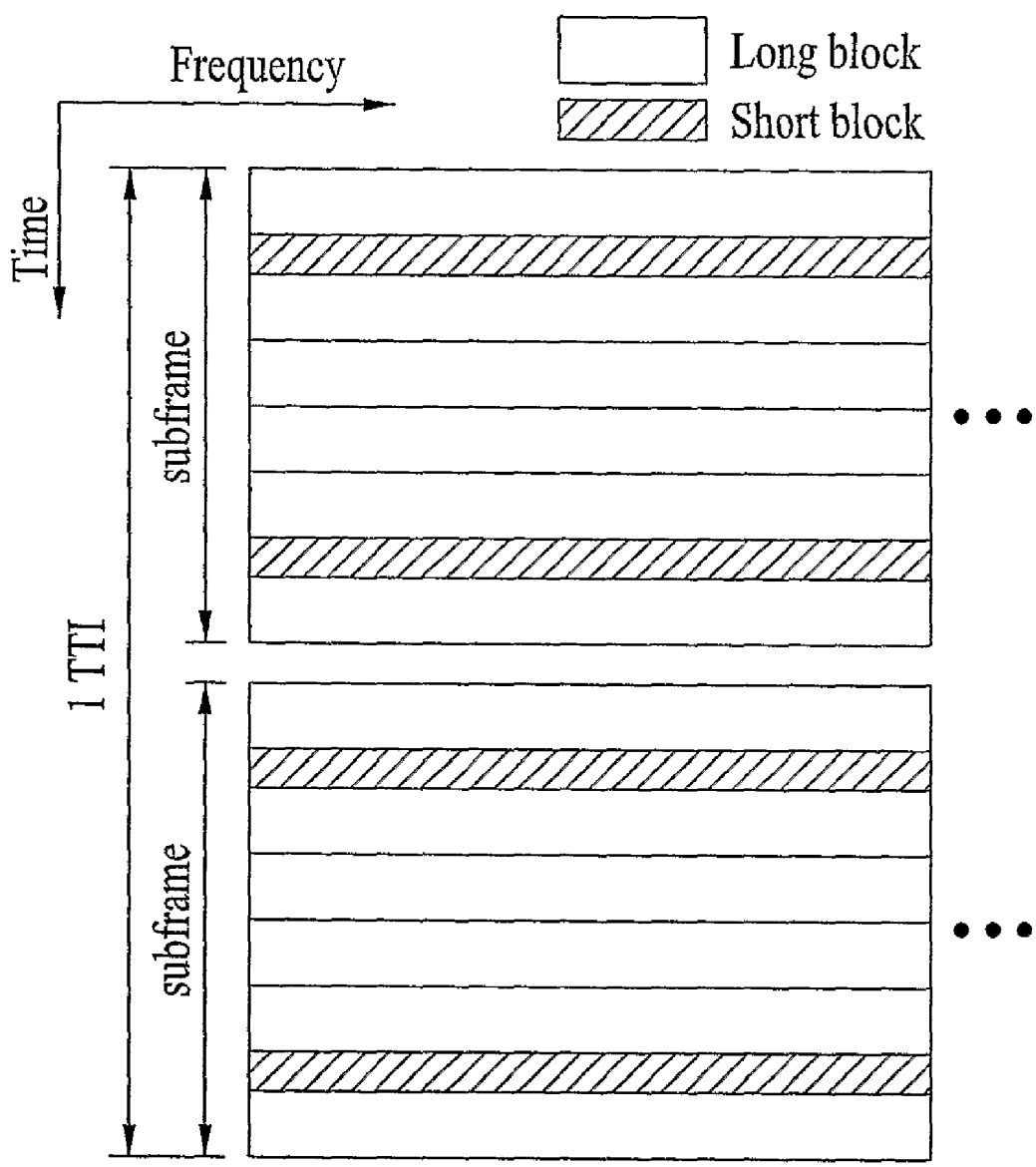
FIG. 5 is a structural diagram illustrating a single transmission time interval (1 TTI) of the 3GPP LTE.

FIG. 5 is a structural diagram illustrating a single transmission time interval (1 TTI) of the 3GPP LTE.

The single TTI acting as a basic unit of data transmission of the LTE system includes two sub-frames in an uplink. A first sub-frame includes 6 long blocks (SBs) and 2 short blocks (SBs). Therefore, the single TTI is configured in the form of FIG. 5.

A method for transmitting the ACK/NACK signal within a single TTI composed of two sub-frames in the uplink according to an embodiment of the present invention will hereinafter be described with reference to the annexed drawings.

Figure 6:
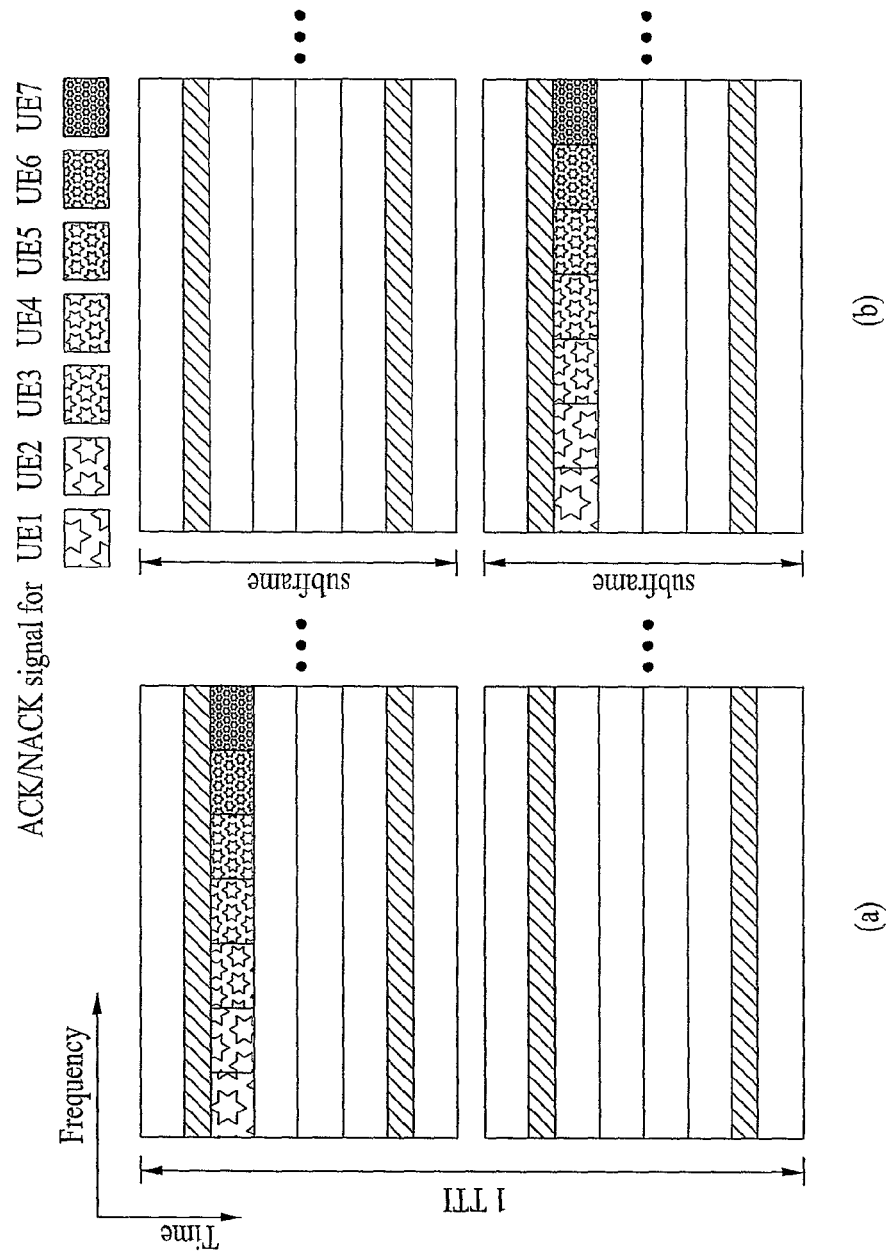
FIG. 6 is a conceptual diagram illustrating a method for transmitting the ACK/NACK signal to a single sub-frame of the 1 TTI according to an embodiment of the present invention.

FIG. 6 is a conceptual diagram illustrating a method for transmitting the ACK/NACK signal to a single sub-frame of the 1 TTI according to an embodiment of the present invention.

According to a method for allowing a user to transmit the ACK/NACK signal, the user transmits the ACK/NACK signal to only one of two sub-frames contained in the single TTI.

In this case, an allocation method for allowing the ACK/NACK signal to be transmitted to the first sub-frame is shown in FIG. 6A, and the other allocation method for allowing the ACK/NACK signal to be transmitted to a second sub-frame is shown in FIG. 6B.

The ACK/NACK signal transmission of the user can be classified into a first case in which repeated transmission of data is needed according to channel situations of each user, and a second case in which the repeated transmission of data is not needed.

If it is determined that the channel environment is poor as the user is distant from a base station, the user repeatedly transmits the ACK/NACK signal to the base station, so that the base station can stably receive the ACK/NACK signal from the user.

Otherwise, if it is determined that the channel environment is good as the user is located adjacent to the base station, the user need not repeatedly transmit the ACK/NACK signal to the base station. Therefore, the user transmits the ACK/NACK signal to only one of two sub-frames contained in the single TTI as shown in FIG. 6, resulting in the prevention of unnecessary repetition of data transmission.

Figure 7:
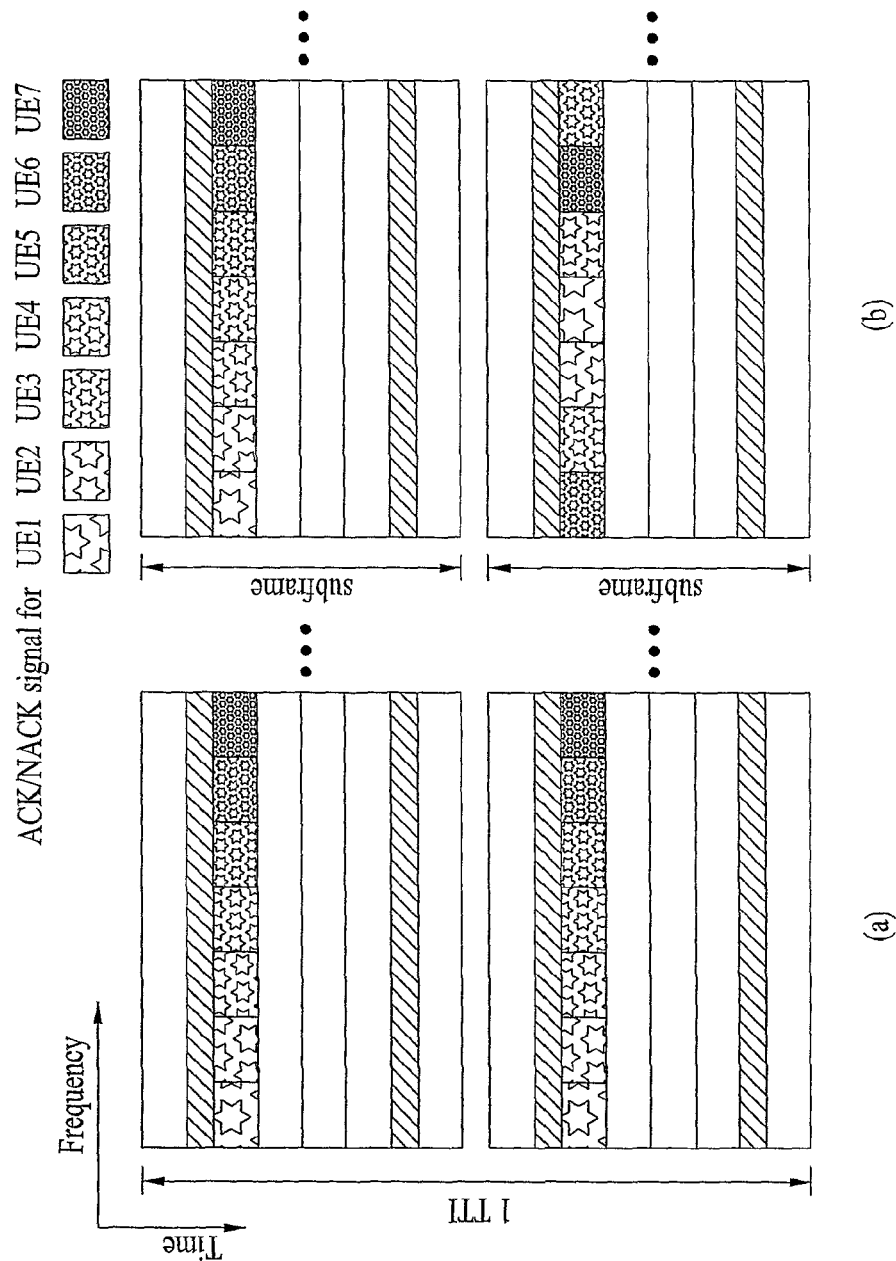
FIG. 7 is a conceptual diagram illustrating a method for transmitting the ACK/NACK signal to two sub-frames of the 1 TTI according to an embodiment of the present invention.

FIG. 7 is a conceptual diagram illustrating a method for transmitting the ACK/NACK signal to two sub-frames of the 1 TTI according to an embodiment of the present invention.

As shown in the above-mentioned example in which the user is distant from the base station, there is a need for the user to repeatedly transmit the ACK/NACK signal to the base station due to the poor channel environment. Therefore, as shown in FIG. 7, the present invention provides a method for transmitting the ACK/NACK signal to all of two sub-frames contained in the single TTI, and a detailed description thereof will hereinafter be described.

In order to use two sub-frames according to the above-mentioned embodiment of the present invention, the following methods can be made available.

The method of FIG. 7A can be adapted to use all the two sub-frames. According to the method of FIG. 7A, a frequency band for transmitting the ACK/NACK signal in the first sub-frame is equal to a frequency band for transmitting the ACK/NACK signal in the second sub-frame.

From the viewpoint of several users, the method of FIG. 7A controls the ACK/NACK signal structure for the first sub-frame to be equal to that of the second sub-frame, so that the ACK/NACK signal is transmitted via the second sub-frame. In this case, the structure used for the first sub-frame is applied to the second sub-frame without any change, so that an additional task or information for allocating the ACK/NACK signal is not required.

Also, the method of FIG. 7B can be adapted to use all the two sub-frames. According to the method of FIG. 7B, a frequency band for transmitting the ACK/NACK signal in the first sub-frame may be different from a frequency band for transmitting the ACK/NACK signal in the second sub-frame as necessary.

From the viewpoint of several users, the method of FIG. 7B controls the ACK/NACK signal structure applied to the first sub-frame to be different from the ACK/NACK signal structure applied to the second sub-frame, so that the ACK/NACK signal is transmitted via the second sub-frame. In this case, the locations of the ACK/NACK signals transmitted from individual sub-frames are different in a time-frequency area, so that a diversity gain can be acquired from the time-frequency area.

Figure 8:
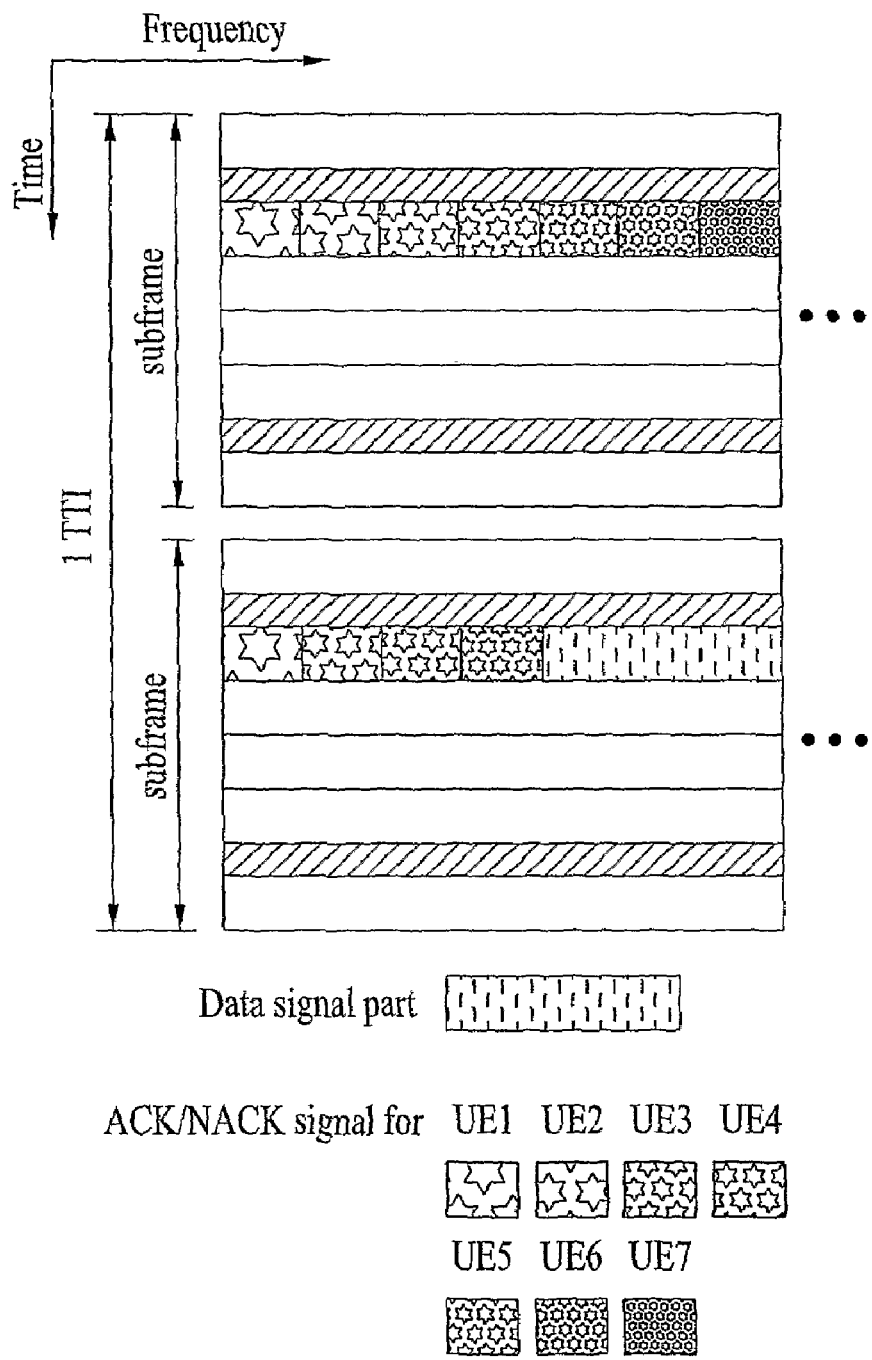
FIG. 8 is a conceptual diagram illustrating a method for transmitting the ACK/NACK signal and data to two sub-frames of the 1 TTI according to an embodiment of the present invention.

FIG. 8 is a conceptual diagram illustrating a method for transmitting the ACK/NACK signal and data to two sub-frames of the 1 TTI according to an embodiment of the present invention.

The method of FIG. 8 uses two sub-frames contained in the single TTI to transmit the ACK/NACK signal, however, it allows the ACK/NACK signal and the data signal to share some parts of symbols occupied by the conventional ACK/NACK signal of the sub-frames. The ACK/NACK signal may be repeatedly transmitted to several symbols to implement a wide coverage, and the methods of FIGS. 7A and 7B show repetitive transmission of the ACK/NACK signal.

If a good channel environment between a user and a base station within a coverage area of the base station is acquired, the user can acquire a desired throughput without repeatedly transmitting the ACK/NACK signal, so that the repetitive transmission is not needed.

Otherwise, if a poor channel environment between a user and a base station within a coverage area of the base station is acquired because the user is distant from the base station, the user may need to repeatedly transmit the ACK/NACK signal.

In more detail, the individual users may repeatedly transmit the ACK/NACK signal or may not repeatedly transmit the same according to communication channel environments between the base station and the individual users, a symbol for transmitting the ACK/NACK signal may have empty areas having no ACK/NACK signal as shown in FIG. 8. In order to solve this problem, the present invention provides a method for allocating the empty areas to implement data transmission.

In order to transmit the data signal to an area not used to transmit the ACK/NACK signal, the system must recognize whether the ACK/NACK signals of other users have been allocated to the above-mentioned unused area. In order to recognize whether the ACK/NACK signal of other users have been allocated to the unused area, the allocation status of the ACK/NACK signals of the individual users must be notified to the system via a downlink control signal.

In this way, the above-mentioned area unused for the ACK/NACK signal transmission can be used by data, resulting in an increased transfer rate.

As shown in FIG. 8, all the LBs for transmitting the ACK/NACK signal of the first sub-frame are used to transmit the ACK/NACK signals of several users. If a specific area denoted by "Data signal part" in FIG. 8 in the second sub-frame is not used for the ACK/NACK signal transmission, the data signal part is allocated to transmit data.

In this case, the data signal part of FIG. 8 may be a symbol unit, however, it should be noted that the data signal part of FIG. 8 may include a specific sharing part in which the ACK/NACK signal of the user who repeatedly transit the ACK/NACK signal and the data are shared in a single symbol.

If the ACK/NACK signal is transmitted to all the sub-frames according to the present invention, the present invention determines whether or not to repeatedly transmit the ACK/NACK signal according to a distance from a user to a base station in a cell, resulting in increased reliability of the system.

In the case of the user who is located adjacent to the base station, the user performs resources allocation to allow data to be transmitted to a corresponding area, instead of repeatedly transmitting the ACK/NACK signal. The above-mentioned resource allocation can be implemented by broadcasting downlink control information.

According to the above-mentioned embodiments of the present invention, a time division multiplexing (TDM), a frequency division multiplexing (FDM), or a code division multiplexing (CDM) can be used to perform data multiplexing between several ACK/NACK signals or between a data signal and the ACK/NACK signals.

And, if the ACK/NACK signal is allocated to a frequency area, all of a localized allocation method and a distributed allocation method can be applied to the present invention.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

[Industrial Applicability]

According to the above-mentioned method for allocating communication resources, the present invention can clearly define a method for determining whether the user's ACK/NACK signal is repeatedly transmitted and transmitting the ACK/NACK signal within a single TTI according to the determined result.

The present invention determines whether the ACK/NACK signal is repeatedly transmitted, and allows corresponding resources to be used for data transmission, so that it maintains a reception reliability of the ACK/NACK signal and increases a processing rate of the same.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for transmitting an ACK/NACK signal, the method comprising:

determining whether the ACK/NACK signal is repeatedly transmitted within a single transmission time interval (TTI); and transmitting the ACK/NACK signal, wherein if the determined result indicates that the ACK/NACK signal is not repeatedly transmitted, the ACK/NACK signal is transmitted to any one of sub-frames contained in the single TTI and data is transmitted to other sub-frames from among the sub-frames contained in the single TTI in consideration of information indicating whether time-frequency areas for transmitting data of other users are used or not via downlink control information, wherein if the determined result indicates that the ACK/NACK signal is repeatedly transmitted, the ACK/NACK signal is repeatedly transmitted to the individual sub-frames contained in the single TTI.

2. The method according to claim 1, wherein the ACK/NACK signal is transmitted through different locations of time-frequency areas in the individual sub-frames contained in the single TTI.

3. The method according to claim 1 or 2, wherein the determined result is different according to a distance from a base station (BS) to the user.

4. A method for transmitting an ACK/NACK signal, the method comprising:

determining whether the ACK/NACK signal is repeatedly transmitted within a single transmission time interval (TTI); and transmitting the ACK/NACK signal, wherein if the determined result indicates that the user does not repeatedly transmit the ACK/NACK signal, the ACK/NACK signal is transmitted to any one of sub-frames contained in the single TTI and data is transmitted to other sub-frames from among the sub-frames contained in the single TTI, wherein if the determined result indicates that the user repeatedly transmits the ACK/NACK signal, the ACK/NACK signal is repeatedly transmitted to the individual sub-frames contained in the single TTI, wherein allocation information of time-frequency areas is broadcasted for transmitting data of each user via downlink control information.

5. The method according to claim 4, further comprising:

if the user who repeatedly transmits the ACK/NACK signal is determined, performing a third setup process for transmitting the ACK/NACK signal by which time-frequency areas of the individual sub-frames contained in the single TTI have different locations.

6. The method according to claim 4 or 5, wherein the determined result is different according to a distance from a base station to the user.

7. The method according to claim 4, wherein the wherein the data is transmitted to other sub-frames from among the sub-frames contained in the single TTI, allows the data and the ACK/NACK signal of the user, who repeatedly transmits the ACK/NACK signal, to be shared in a single symbol in other sub-frames from among the sub-frames contained in the single TTI.

* * * * *